(12) United States Patent
Zhao

(10) Patent No.: US 12,126,449 B2
(45) Date of Patent: Oct. 22, 2024

(54) DATA TRANSMISSION METHOD AND APPARATUS IN DIRECT COMMUNICATION, DEVICE, AND SYSTEM

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 426 days.

(21) Appl. No.: 17/418,753

(22) PCT Filed: Dec. 29, 2018

(86) PCT No.: PCT/CN2018/125827
§ 371 (c)(1),
(2) Date: Jun. 25, 2021

(87) PCT Pub. No.: WO2020/133506
PCT Pub. Date: Jul. 2, 2020

(65) Prior Publication Data
US 2022/0077962 A1    Mar. 10, 2022

(51) Int. Cl.
*H04L 12/00* (2006.01)
*H04L 1/18* (2023.01)
*H04L 5/00* (2006.01)
*H04W 4/44* (2018.01)
*H04W 72/044* (2023.01)
*H04W 76/14* (2018.01)

(52) U.S. Cl.
CPC ............. *H04L 1/18* (2013.01); *H04L 5/003* (2013.01); *H04W 4/44* (2018.02); *H04W 72/044* (2013.01); *H04W 76/14* (2018.02)

(58) Field of Classification Search
None
See application file for complete search history.

(56) References Cited

U.S. PATENT DOCUMENTS

2019/0335447 A1* 10/2019 Sarkis .................. H04L 1/1861
2020/0374031 A1* 11/2020 Baldemair ............ H04L 5/0057
(Continued)

OTHER PUBLICATIONS

European Patent Application No. 18944547.1, Search Report dated Oct. 29, 2021, 13 pages.
(Continued)

*Primary Examiner* — Noel R Beharry
*Assistant Examiner* — Lionel Preval
(74) *Attorney, Agent, or Firm* — Cozen O'Connor

(57) ABSTRACT

A method for transmitting data based on a direct-link communication, a device, and a system. The method includes: sending by a first terminal an uplink hybrid auto repeat request (HARQ) feedback bit and a direct-link HARQ feedback bit to an access network device on a same physical layer uplink channel within a target time unit when the uplink HARQ feedback bit and the direct-link HARQ feedback bit need to be sent within the target time unit. The uplink HARQ feedback bit is configured to indicate a reception status corresponding to downlink data, and the direct-link HARQ feedback bit is configured to indicate a reception status corresponding to direct-link data, wherein the direct-link data is physical layer data sent by the first terminal to a second terminal via a direct link.

15 Claims, 7 Drawing Sheets

(56) References Cited

U.S. PATENT DOCUMENTS

2021/0184801 A1* 6/2021 El Hamss ............. H04L 1/1896
2021/0306824 A1* 9/2021 Li .......................... H04W 4/40

OTHER PUBLICATIONS

Fraunhofer HHI et al: "Physical Layer Procedures for Unicast and Groupcast", 3GPP TSG RAN WG1, Meeting #95. Spokane, USA; Nov. 12, 2018-Nov. 16, 2018, R1-1812401; Nov. 11, 2018, 8 pages.
Xiaomi Communications: "On support of HARQ for V2x communications", 3GPP TSG RAN WG1, Meeting #95 Spokane, USA; Nov. 12, 2018-Nov. 16, 2018; R1-183287; Nov. 11, 2018; 2 pages.

* cited by examiner

DATA TRANSMISSION METHOD AND APPARATUS IN DIRECT COMMUNICATION, DEVICE, AND SYSTEM

CROSS-REFERENCE TO RELATED APPLICATIONS

This application is a US National phase based on International Application No. PCT/CN2018/125827, filed on Dec. 29, 2018, the entire contents of which are incorporated herein by reference.

TECHNICAL FIELD

The present disclosure relates to a field of communication technology, and more particularly to a method for transmitting data based on a direct-link communication, a device and a storage medium.

BACKGROUND

In the Vehicle-to-Everything (V2X) technology, a direct-link communication can be established between a vehicle-mounted device and another device (such as another vehicle-mounted device, a road side installation, and so on) through a sidelink. The direct-link communication has characteristics such as short time delay, small overhead, etc.

In related art, a direct-link communication mode based on scheduling of an access network device may include the following. The access network device sends schedule information to a transmitting side user device (referred to as first terminal) of the direct-link communication via downlink control information (DCI), and the first terminal sends direct-link data to a receiving side user device (referred to as second terminal) of the direct-link communication through the sidelink based on the schedule information of the access network device.

Since a terminal based on the scheduling of the access network device may have downlink and uplink transmissions and a direct-link communication transmissions simultaneously, and the reach of the transmission data is indefinite, an uplink hybrid auto repeat request (HARQ) feedback of downlink data and a direct-link HARQ feedback of direct-link data may need to be transmitted simultaneously within a same time unit. However, in a 5G new radio (5G NR) system, the terminal merely transmits one uplink HARQ feedback of the downlink data within the same time unit. At present, there is no solution as to how the terminal can handle a resource collision problem due to superposition transmission of the direct-link HARQ feedback and the uplink HARQ feedback on time domain when the direct-link HARQ feedback exists.

SUMMARY

The present disclosure provides a method and an apparatus for transmitting data based on a direct-link communication, a device and a storage medium. The technical solutions will be described as follows.

According to a first aspect of embodiments of the present disclosure, a method for transmitting data based on a direct-link communication is provided. The method includes: sending by a first terminal an uplink HARQ feedback bit and a direct-link HARQ feedback bit to an access network device on a same physical layer uplink channel within a target time unit when the uplink HARQ feedback bit and the direct-link HARQ feedback bit need to be sent within the target time unit. The uplink HRAQ feedback bit is configured to indicate a reception status corresponding to downlink data, and the direct-link HARQ feedback bit is configured to indicate a reception status corresponding to direct-link data. The direct-link data is physical layer data sent by the first terminal to a second terminal via a direct link.

According to a second aspect of embodiments of the present disclosure, a method for transmitting data based on a direct-link communication is provided. The method includes receiving by an access network device an uplink HARQ feedback bit and a direct-link HARQ feedback bit sent by a first terminal on a same physical layer uplink channel within a target time unit when the uplink HARQ feedback bit and the direct-link HARQ feedback bit sent by the first terminal need to be received within the target time unit. The uplink HARQ feedback bit is configured to indicate a reception status corresponding to downlink data, and the direct-link HARQ feedback bit is configured to indicate a reception status corresponding to direct-link data. The direct-link data is physical layer data sent by the first terminal to a second terminal via a direct link.

According to a third aspect of embodiments of the present disclosure, an apparatus for transmitting data based on a direct-link communication is provided. The apparatus is applicable in a first terminal, and includes a sending module. The sending module is configured to send by the first terminal an uplink HARQ feedback bit and a direct-link HARQ feedback bit to an access network device on a same physical layer uplink channel within a target time unit when the uplink HARQ feedback bit and the direct-link HARQ feedback bit need to be sent within the target time unit. The uplink HARQ feedback bit is configured to indicate a reception status corresponding to downlink data, and the direct-link HARQ feedback bit is configured to indicate a reception status corresponding to direct-link data. The direct-link data is physical layer data sent by the first terminal to a second terminal via a direct link.

According to a fourth aspect of embodiments of the present disclosure, an apparatus for transmitting data based on a direct-link communication is provided. The apparatus is applicable in an access network device, and includes a receiving module. The receiving module is configured to receive an uplink HARQ feedback bit and a direct-link HARQ feedback bit sent by a first terminal on a same physical layer uplink channel within a target time unit when the uplink HARQ feedback bit and the direct-link HARQ feedback bit sent by the first terminal need to be received within the target time unit. The uplink HARQ feedback bit is configured to indicate a reception status corresponding to downlink data, and the direct-link HARQ feedback bit is configured to indicate a reception status corresponding to direct-link data. The direct-link data is physical layer data sent by the first terminal to a second terminal via a direct link.

According to a fifth aspect of embodiments of the present disclosure, a terminal is provided. The terminal includes a processor, a transceiver connected to the processor, and a memory configured to store instructions executable by the processor. The processor is configured to load and execute the instructions to perform steps of the method for transmitting data based on a direct-link communication according to the first aspect or any possible implementation of the first aspect.

According to a sixth aspect of embodiments of the present disclosure, an access network device is provided. The access network device includes a processor, a transceiver connected to the processor, and a memory configured to store instructions executable by the processor. The processor is configured to load and execute the instructions to perform steps of the method for transmitting data based on a direct-link communication according to the second aspect or any possible implementation of the second aspect.

According to a seventh aspect of embodiments of the present disclosure, a data transmission system based on a direct-link communication is provided. The data transmission system includes a terminal and an access network device. The terminal is such apparatus for transmitting data based on a direct-link communication according to the third aspect or any possible implementation of the third aspect. The access network device is such apparatus for transmitting data based on a direct-link communication according to the fourth aspect or any possible implementation of the fourth aspect.

According to an eighth aspect of embodiments of the present disclosure, a data transmission system based on a direct-link communication is provided. The data transmission system includes a terminal and an access network device. The terminal is, for example, a terminal according to the fifth aspect. The access network device is, for example, an access network device according to the sixth aspect.

According to a ninth aspect of embodiments of the present disclosure, a computer-readable storage medium is provided. The computer-readable storage medium has at least one instruction, at least one program, at least one set of codes or set of instructions stored therein. The at least one instruction, the at least one program, the at least one set of codes or set of instructions is loaded and executed by a processor to implement steps of the method for transmitting data based on a direct-link communication according to the first aspect or any possible implementation of the first aspect. Or, the at least one instruction, the at least one program, the at least one set of codes or set of instructions is loaded and executed by a processor to implement steps of the method for transmitting data based on a direct-link communication according to the second aspect or any possible implementation of the second aspect.

It should be understood that the above general description and the following details are explanatory and illustrative, and shall not be construed to limit the present disclosure.

BRIEF DESCRIPTION OF THE DRAWINGS

The accompanying drawings are incorporated into the disclosure as one part therein to illustrate embodiments of the present disclosure. The accompanying drawings together with the specification explain the principle of the present disclosure.

DETAILED DESCRIPTION

Figure 1:
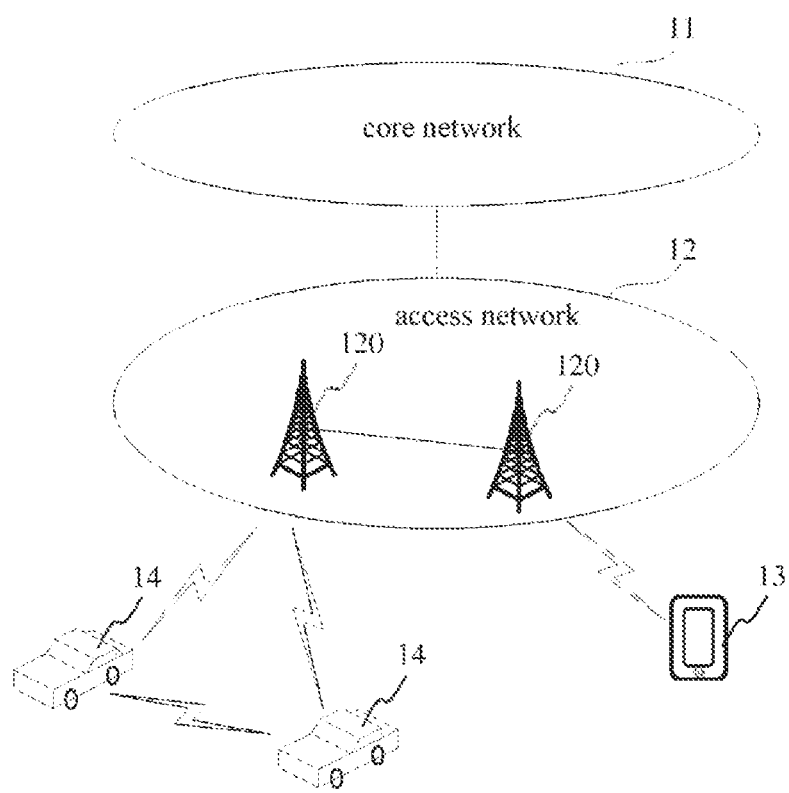
FIG. 1 is a schematic diagram illustrating a network structure according to an example embodiment.

Reference will be made in detail to embodiments of the present disclosure. Throughout the descriptions with reference to the accompanying drawings, unless specified or limited otherwise, the same or similar elements and the elements are denoted by the same reference numeral in different drawings. The implementations described in the following embodiments shall not be construed to represent all implementations of the present disclosure. Rather, they are merely some examples of the apparatus and method according to some aspects of the present disclosure, as described in the claims.

The network structure and business scenarios described in the embodiments of the present disclosure are used to better explain the technical solutions of the present disclosure, but not constructed to limit the technical solutions of the present disclosure. It would be appreciated by those skilled in the art that with the evolution of network structure and the emergence of new business scenarios, the technical solutions of the present disclosure may also be suitable to similar technical problems.

FIG. 1 is a schematic diagram of a network structure according to an embodiment of the present disclosure. The network structure may be a network structure of a C-V2X system. C represents Cellular network, and the C-V2X system is a vehicle-mounted wireless communication system formed based on evolution of the 3G, 4G or 5G cellular network communication system. The network structure may include a core network 11, an access network 12, a terminal 13 and a vehicle 14.

The core network 11 includes several core network devices. The functions of the core network device mainly include providing user connection, managing users, carrying businesses, and using as a carrying network to provide an interface to an external network. For example, the core network in the long term evolution (LTE) system may include a mobility management entity (MME), a serving gateway (S-GW), a PDN gateway (P-GW) or other devices. The core network in the 5G NR system may include an access and mobility management function (AMF) entity, a user plane function (UPF) entity, a session management function (SMF) entity and other devices.

The access network 12 includes several access network devices 120. The access network device 120 and the core network device 110 communicate with each other through a certain interface technology, for example through a Si interface in the LTE system, an NG interface in the 5G NR system. The access network device 120 may be a base station (BS). The base station is a device deployed in the access network and configured for providing a wireless communication function to a terminal. The base station may include various forms of macro base stations, micro stations, relay stations, access points and so on. In systems using different wireless access technologies, the device with the function of base station may be designated differently, for example, eNodeB or eNB in the LTE system, gNodeB or gNB in the 5G NR system. With the evolution of communication technology, the designation "base station" may be changed. For ease of description, in the embodiments of the present disclosure, the above devices for providing the wireless communication function to the terminal are collectively called access network device.

The terminal 130 may include various handheld devices, vehicle-mounted devices, wearable devices, computing devices or other processing devices connected to wireless Modems that have the wireless communication function, and various forms of user equipment (UEs), mobile stations (MSs), terminal devices and so on. For ease of description, in the embodiments of the present disclosure, the above mentioned devices are collectively called terminal. The access network device 120 and the terminal communicate with each other using a certain new radio technology, for example through a Uu interface.

The vehicle 14 may be an autonomous vehicle or a non-autonomous vehicle. The vehicle 140 has a vehicle-mounted device. The vehicle 14 may communicate with another vehicle, the terminal 13 or another device such as a road side unit (RSU) through the vehicle-mounted device. The vehicle-mounted device may also referred to as vehicle-mounted terminal, vehicle-mounted communication device, or other designations, which is not limited herein. The vehicle-mounted device may be a device integrated into a telematics box (T-BOX), or may be a device separated from the vehicle body. In addition, the vehicle-mounted device may be assembled in the vehicle 14 before or after the vehicle leaves factory.

The vehicle-mounted device of the vehicle 14 and another device (such as another vehicle-mounted device, terminal 13, RSU and so on) may communicate with each other through a direct-link communication interface (such as PC5 interface). Correspondingly, the communication link established based on the direct-link communication interface can be referred to as direct link or sidelink. Further, the vehicle-mounted device of the vehicle 14 and another device may perform the communication through the access network 12 and the core network 11, i.e., using a communication link between the terminal 13 in the cellular network and the access network device 120. Compared with the communication based on the Uu interface, the communication based on the direct-link communication interface has characteristics such as short time delay, small overhead and so on, which is suitable to the communication between the vehicle-mounted device and another surrounding device close to the vehicle-mounted device geographically.

The above network structure illustrated in FIG. 1 may implement a V2X business scenario. The network structure may also include a RSU, a V2X application server, a V2X control function node or other devices, which is not limited herein. Further, the technical solutions described in the present disclosure may be suitable to the 5G NR system, or to a subsequent evolution system of the 5G NR system.

In the embodiment of the present disclosure, for the direct-link communication in the V2X business scenario, a method for transmitting data based on a direct-link communication is provided, to solve the resource collision problem.

In the embodiment of the present disclosure, a first terminal and a second terminal are devices at two ends of the direct-link communication in the V2X business scenario. A sidelink may be established between the first terminal and the second terminal through the direct-link communication interface (such as PC5 interface), and interaction of user plane data and control plane signaling may be implemented through the sidelink. For example, the first terminal may be the vehicle-mounted device of the vehicle 14 in the network structure illustrated in FIG. 1, and the second terminal may be a vehicle-mounted device of another device or may be the terminal 13 or the RSU. For another example, the first terminal may be the terminal 13 in the network structure illustrated in FIG. 1, and the second terminal may be another terminal or may be the vehicle-mounted device of the vehicle 14 or the RSU. In some embodiments, for the same device (such as the same vehicle-mounted device or the same terminal), it may be configured as the first terminal in some scenarios and may be configured as the second terminal in some other scenarios.

In the embodiment of the present disclosure, the first terminal may also referred to as a transmitting side user device in the direct-link communication and the second terminal may also referred to as a receiving side user device in the direct-link communication.

In the following, the technical solutions of the present disclosure will be described in combination with some example embodiments.

Figure 2:
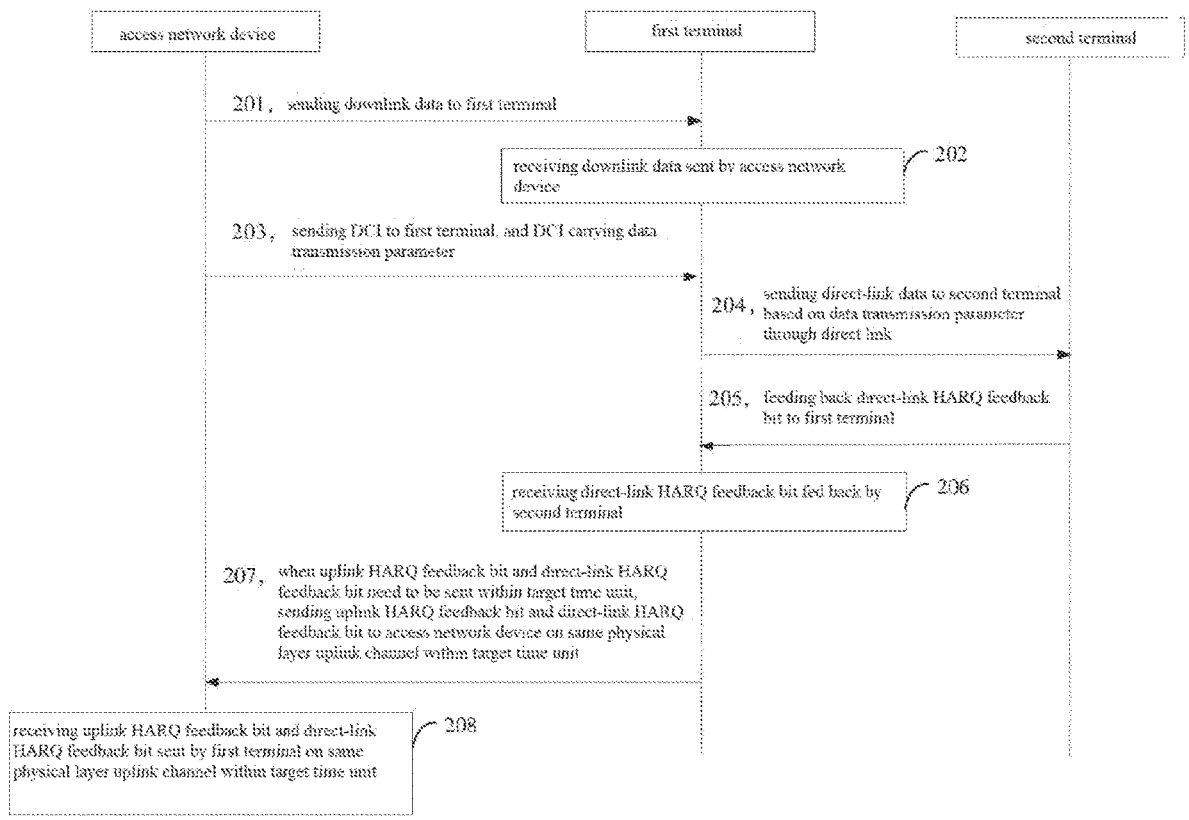
FIG. 2 is a flowchart illustrating a method for transmitting data based on a direct-link communication according to an example embodiment.

FIG. 2 is a flowchart illustrating a method for transmitting data based on a direct-link communication according to an example embodiment of the present disclosure. The method can be applied in the network structure in FIG. 1. The method may include the following.

At block 201, the access network device sends downlink data to the first terminal.

The access network device sends the downlink data to the first terminal though a downlink channel. Exemplary, the downlink channel includes a physical downlink shared channel (PDSCH).

At block 202, the first terminal receives the downlink data sent by the access network device.

Correspondingly, the first terminal receives the downlink data sent by the access network device through the downlink channel.

At block 203, the access network device sends downlink control information (DCI) to the first terminal, and the DCI carries a data transmission parameter.

Alternatively, the data transmission parameter is configured to indicate a time-frequency resource and/or a modulation and coding scheme.

At block 204, the first terminal sends direct-link data to the second terminal based on the data transmission parameter through the direct link.

Alternatively, the first terminal sends the direct-link data to the second terminal through the direct link based on the time-frequency resource and/or the modulation coding scheme indicated in the data transmission parameter.

It should be noted that, the direct-link communication mode between the first terminal and the second terminal in the embodiment is a direct-link communication mode based on scheduling of the access network device. That is, the first terminal performs data transmission based on the scheduling of the access network device. For the direct-link communication mode based on scheduling of the access network device, since the scheduling is implemented by the access network device, a direct-link hybrid auto repeat request (HARQ) feedback bit corresponding to the direct-link data needs to be transmitted from the second terminal back to the access network device, to facilitate retransmission of scheduling data or transmission of new data at the access network device side. Given that the first terminal may be in a coverage area of access network device different from the second terminal or may be out of coverage, the direct-link HARQ feedback bit needs to be transmitted from the second terminal to the first terminal, and reported by the first terminal to the access network device.

The direct-link data may be physical layer data sent by the first terminal to the second terminal through the direct link.

The first terminal sends the direct-link data to the second terminal by using a target time-frequency resource of the direct link.

Alternatively, the target time-frequency resource is a predefined or preconfigured time-frequency resource.

Alternatively, the first terminal may send control information to the second terminal before or when sending the direct-link data. The control information is configured to indicate reception related information of the physical layer data.

Alternatively, the reception related information includes a time domain position and/or a frequency domain position of the target time-frequency resource for carrying the physical layer data. In some embodiments, the reception related information further includes a modulation and coding scheme (MCS) of the physical layer data, a hybrid ARQ process number (HARQ-ID), a new-data indicator (NDI) or other information.

At block 205, the second terminal feeds back the direct-link HARQ feedback bit to the first terminal.

Correspondingly, the second terminal receives the direct-link data sent by the first terminal. Alternatively, the second terminal receives the direct-link data sent by the first terminal using the target time-frequency resource of the direct link.

The second terminal feeds back the direct-link HARQ feedback bit to the first terminal. The direct-link HARQ feedback bit is configured to indicate a reception status corresponding to the direct-link data.

The reception status corresponding to the direct-link data includes an acknowledgement (ACK) status, or a non-acknowledgement (NACK) status.

The ACK status is configured to indicate that the direct-link data is correctly received by the second terminal.

The NACK status includes an un-received status and/or an incorrect-received status. The un-received status is configured to indicate that the direct-link data is not received by the second terminal. The incorrect-received status is configured to indicate that second terminal receives direct-link data but the received direct-link data is different from the direct-link data sent by the first terminal, i.e., incorrect direct-link data is received.

After receiving the direct-link data, the second terminal processes the received direct-link data, for example, by demodulating, decoding the direct-link data and so on. In the process, the second terminal may determine the reception status of the direct-link data.

Alternatively, the second terminal sends the direct-link HARQ feedback bit to the first terminal through a physical sidelink feedback channel (PSFCH).

At block 206, the first terminal receives the direct-link HARQ feedback bit fed back by the second terminal.

Correspondingly, the first terminal receives the direct-link HARQ feedback bit sent by the second terminal through the PSFCH.

It should be noted that an execution order of blocks 201-202 (i.e., the process of the first terminal receiving the downlink data) and blocks 203-206 (i.e., the process of the first terminal receiving the direct-link HARQ feedback bit) is not limited in the embodiment.

At block 207, when an uplink HARQ feedback bit and the direct-link HARQ feedback bit need to be sent within a target time unit, the first terminal sends the uplink HARQ feedback bit and the direct-link HARQ feedback bit to the access network device on a same physical layer uplink channel within the target time unit.

The uplink HARQ feedback bit is configured to indicate a reception status corresponding to downlink data, and the direct-link HARQ feedback bit is configured to indicate the reception status corresponding to the direct-link data.

The reception status corresponding to downlink data includes an ACK status or a NACK status. The ACK status is configured to indicate that the downlink data is correctly received by the first terminal. The NACK status includes an un-received status and/or an incorrect-received status. The un-received status is configured to indicate that the downlink data is not received by the first terminal. The incorrect-received status is configured to indicate that first terminal receives downlink data but the received downlink data is different from the downlink data sent by the access network device, i.e., incorrect downlink data is received.

Alternatively, the target time unit refers to a time unit corresponding to the time when the terminal device needs to send the uplink HARQ feedback bit and the direct-link HARQ feedback bit. Exemplary, the target time unit may be a symbols, b symbol groups, c slots or d subframes, where a, b, c and d are positive integers, which is not limited herein.

Alternatively, the first terminal receives third configuration information sent by the access network device, and determines a physical resource of the same physical layer uplink channel within the target time unit based on the third configuration information.

Alternatively, the physical layer uplink channel is an uplink channel for sending the uplink HARQ feedback bit to the access network device.

Alternatively, the physical layer uplink channel is an uplink channel based on a first communication protocol or a second communication protocol. The first communication protocol includes the LTE protocol, and the second communication protocol includes the NR protocol.

Alternatively, the physical layer uplink channel is a physical uplink control channel (PUCCH). Exemplary, a format of the PUCCH may be any one of PUCCH format 1, PUCCH format 1a, PUCCH format 1b, PUCCH format 2, PUCCH format 2a, PUCCH format 2b, PUCCH format 3, PUCCH format 4 and PUCCH format 5.

The first terminal sends the uplink HARQ feedback bit and the direct-link HARQ feedback bit to the access network device in the physical resource of the same physical layer uplink channel within the target time unit.

At block 208, the access network device receives the uplink HARQ feedback bit and the direct-link HARQ feedback bit sent by the first terminal on the same physical layer uplink channel within the target time unit.

Alternatively, when the uplink HARQ feedback bit and the direct-link HARQ feedback bit sent by the first terminal need to be received within the target time unit, the access network device receives the uplink HARQ feedback bit and the direct-link HARQ feedback bit sent by the first terminal on the same PUCCH within the target time unit.

In conclusion, in the embodiment, when the uplink HARQ feedback bit and the direct-link HARQ feedback bit need to be sent within the target time unit, the first terminal may reuse the uplink HARQ feedback bit and the direct-link HARQ feedback bit by using the same physical layer uplink channel within the target time unit to report, such that the resource collision problem due to superposition transmission of the direct-link HARQ feedback and the uplink HARQ feedback on time domain can be avoided, thus ensuring a success rate of information reception and transmission in a direct-link communication scenario, and facilitating improving a transmission efficiency of HARQ feedback.

Figure 3:
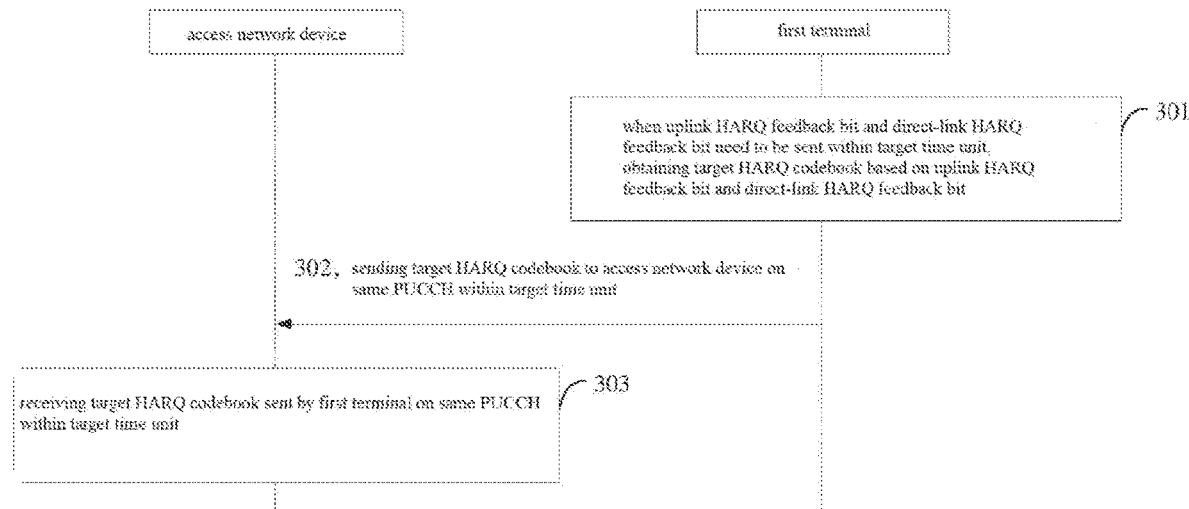
FIG. 3 is a flowchart illustrating a method for transmitting data based on a direct-link communication according to another example embodiment.

It should be noted that the first terminal may merge the uplink HARQ feedback bit and the direct-link HARQ feedback bit in many possible implementations. In a possible implementation, block 207 and 208 may be replaced with the following, as illustrated in FIG. 3.

At block 301, when the uplink HARQ feedback bit and the direct-link HARQ feedback bit need to be sent within a target time unit, the first terminal obtains a target HARQ codebook based on the uplink HARQ feedback bit and the direct-link HARQ feedback bit.

Alternatively, before the first terminal obtains the target HARQ codebook based on the uplink HARQ feedback bit and the direct-link HARQ feedback bit, the method may further include sending by the access network device a first downlink signaling. Correspondingly, the first terminal receives the first downlink signaling sent by the access network device. The first downlink signaling is configured to indicate a configured codebook type of the target HARQ codebook.

Alternatively, the codebook type of the target HARQ codebook includes one of a semi-static HARQ codebook and a dynamic HARQ codebook.

When the codebook type of the target HARQ codebook is the semi-static HARQ codebook, it indicates that both a codebook type corresponding to the uplink HARQ feedback bit and a codebook type corresponding to the direct-link HARQ feedback bit are semi-static HARQ codebooks. When the codebook type of the target HARQ codebook is the dynamic HARQ codebook, it indicates that both the codebook type corresponding to the uplink HARQ feedback bit and the codebook type corresponding to the direct-link HARQ feedback bit are dynamic HARQ codebooks.

The target HARQ codebook includes the uplink HARQ feedback bit and the direct-link HARQ feedback bit. Based on ranking the uplink HARQ feedback bit and the direct-link HARQ feedback bit in different orders, the generated target HARQ codebook includes, but is not limited to the following implementations.

In a possible implementation, the target HARQ codebook includes the uplink HARQ feedback bit and the direct-link HARQ feedback bit ranked in a first predetermined order, and both the codebook type corresponding to the uplink HARQ feedback bit and the codebook type corresponding to the direct-link HARQ feedback bit are semi-static HARQ codebooks.

Alternatively, the first predetermined order includes: an order of the direct-link HARQ feedback bit being in front of the uplink HARQ feedback bit, or an order the uplink HARQ feedback bit being in front of the direct-link HARQ feedback bit, or a time sequence corresponding to a plurality available data transmission opportunities for HARQ feedback within the target time unit, or a preconfigured sequence corresponding to the plurality available data transmission opportunities.

Alternatively, in a possible implementation, the target HARQ codebook includes the uplink HARQ feedback bit and the direct-link HARQ feedback bit ranked in a time sequence, and both the codebook type corresponding to the uplink HARQ feedback bit and the codebook type corresponding to the direct-link HARQ feedback bit are dynamic HARQ codebooks.

Alternatively, the time sequence is a sequence indicated in a downlink assignment index (DAI) in the DCI. The DAI includes a count DAI value and/or a total DAI value. The count DAI value is configured to indicate a transmission of the downlink data and a transmission of the direct-link data fed back within a same time unit.

Alternatively, in another possible implementation, the target HARQ codebook includes an uplink HARQ sub codebook and a direct-link HARQ sub codebook ranked in a second predetermined order. The uplink HARQ sub codebook includes the uplink HARQ feedback bit and the direct-link HARQ sub codebook includes the direct-link HARQ feedback bit.

Alternatively, the second predetermined order includes: an order of the direct-link HARQ feedback bit being in front of the uplink HARQ feedback bit, or an order the uplink HARQ feedback bit being in front of the direct-link HARQ feedback bit, or an order of the semi-static codebook being in front of the dynamic codebook, or an order of the dynamic codebook being in front of the semi-static codebook.

It should be noted that, regarding the process of the first terminal obtaining the target HARQ codebook based on the uplink HARQ feedback bit and the direct-link HARQ feedback bit, reference may be made to related details of the following embodiments, which is not described now.

At block 302, the first terminal sends the target HARQ codebook to the access network device on the same PUCCH within the target time unit.

Alternatively, after the first terminal obtains the target HARQ codebook which includes the uplink HARQ feedback bit and the direct-link HARQ feedback bit, the first terminal may send the target HARQ codebook to the access network device on the same PUCCH within the target time unit.

At block 303, the access network device receives the target HARQ codebook sent by the first terminal on the same PUCCH within the target time unit.

Correspondingly, when the uplink HARQ feedback bit and the direct-link HARQ feedback bit sent by the first terminal need to be received within the target time unit, the access network device receives the target HARQ codebook sent by the first terminal on the same PUCCH within the target time unit.

It should be noted that the terms such as DCI, DAI, PDCCH, PUCCH, PSFCH, ACK/NACK involved in the embodiment may refer to related description of 3GPP protocol, which is not elaborated herein.

Alternatively, the above block 301 in which the first terminal obtains the target HARQ codebook based on the uplink HARQ feedback bit and the direct-link HARQ feedback bit may include, but be not limited to the following possible implementations.

In a possible implementation, the first terminal may mix the uplink HARQ feedback bit for at least one downlink data transmission and the direct-link HARQ feedback bit for at least one direct-link data transmission to obtain the target HARQ codebook.

In this implementation, the codebook type corresponding to the uplink HARQ feedback bit and the codebook type corresponding to the direct-link HARQ feedback bit are the same. The codebook type corresponding to the uplink HARQ feedback bit may be predefined or preconfigured, and the codebook type corresponding to the direct-link HARQ feedback bit is configured to be the same as the codebook type corresponding to the uplink HARQ feedback bit in default.

The codebook type includes the semi-static HARQ codebook and the dynamic HARQ codebook.

For the semi-static HARQ codebook, the first terminal determines the target time unit, lists all available data transmission opportunities (including uplink data transmission opportunity and direct-link data transmission opportunity) for sending HARQ feedback bits within the target time unit, and merge all the HARQ feedback bits at the available data transmission opportunities based on a maximum feedback bit number configured by the system.

Figure 4:
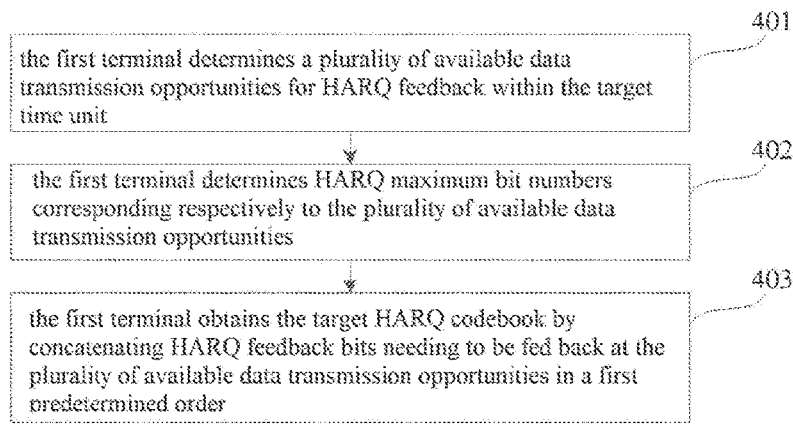
FIG. 4 is a flowchart illustrating a method for transmitting data based on a direct-link communication according to another example embodiment.

Alternatively, when both the codebook type corresponding to the uplink HARQ feedback bit and the codebook type corresponding to the direct-link HARQ feedback bit are semi-static HARQ codebooks, the first terminal obtains the target HARQ codebook based on the uplink HARQ feedback bit and the direct-link HARQ feedback bit by the following blocks, as illustrated in FIG. 4.

At block 401, the first terminal determines a plurality of available data transmission opportunities for HARQ feedback bits within the target time unit.

Alternatively, the first terminal receives a time interval set configured by the access network device for the first terminal, and determines the plurality of available data transmission opportunities for HARQ feedback bits within the target time unit based on the time interval set. The plurality of available data transmission opportunities include a downlink data transmission opportunity and a direct-link data transmission opportunity. The time interval set is a set of a time interval between a transmission of the downlink data and a transmission of the uplink HARQ feedback bit corresponding to the downlink data and/or a time interval between a transmission of the direct-link data and a transmission of the direct-link HARQ feedback bit corresponding to the direct-link data.

Alternatively, the access network device sends first configuration information to the first terminal. The first configuration information is configured to indicate the time interval set. Correspondingly, the first terminal receives the first configuration information sent by the access network device and determines the configured time interval set based on the first configuration information.

Alternatively, the time interval set includes a first time interval set and/or a second time interval set. The first time interval set is a set including the time interval between the transmission of the downlink data and the transmission of the uplink HARQ feedback bit corresponding to the downlink data. The second time interval set is a set including the time interval between the transmission of the direct-link data and the transmission of the direct-link HARQ feedback bit corresponding to the direct-link data. It should be noted that, the first time interval set and the second time interval set may be configured by the same configuration information or by different configuration information, which is not limited herein.

Alternatively, the terminal determines the plurality of available data transmission opportunities for the HARQ feedback bits within the target time unit based on the time interval set.

Alternatively, the available data transmission opportunity (TxOP) refers to a consecutive time on an unlicensed frequency band accessible to a communication device without clear channel assessment (CCA) after obtaining a usage opportunity of the unlicensed frequency band through CCA.

In the embodiment, the available data transmission opportunity may include merely a time unit in downlink consecutive time, or merely a time unit in direct-link consecutive time, or both the time unit in the downlink consecutive time and the time unit in the direct-link consecutive time. The time unit in the downlink consecutive time refers to a time unit for transmitting the downlink data. The time unit in the direct-link consecutive time refers to a time unit for transmitting the direct-link data. The available data transmission opportunity may be referred to as channel occupancy, or maximum channel occupancy time (MCOT), which is not limited herein.

Since it is impossible that the first terminal receives the downlink data and sends the direct-link data simultaneously, if a possible downlink data transmission and the direct-link data transmission have a time superposition, it may be counted as one possible available data transmission opportunity.

At block 402, the first terminal determines HARQ maximum bit numbers corresponding respectively to the plurality of available data transmission opportunities.

Alternatively, the first terminal receives a first HARQ maximum bit number of the direct-link HARQ feedback bit and a second HARQ maximum bit number of the uplink HARQ feedback bit configured by the access network device for the first terminal, and determines a larger value of the first HARQ maximum bit number and the second HARQ maximum bit number as the HARQ maximum bit number.

If the access network device configures the first HARQ maximum bit number needing to be fed back in each transmission of the direct-link data for the second terminal, the first terminal compares the first HARQ maximum bit number with the second HARQ maximum bit number, and calculate the HARQ maximum bit number needing to be fed back at the corresponding available data transmission opportunity based on the lager value of the two. If the access network device does not configure the first HARQ maximum bit number needing to be fed back in each transmission of the direct-link data for the second terminal, the first terminal calculate the HARQ maximum bit number needing to be fed back at the corresponding available data transmission opportunity based on the second HARQ maximum bit number of the uplink HARQ feedback bit configured by the access network device.

Alternatively, the access network device sends second configuration information to the first terminal. The second configuration information is configured to indicate the first HARQ maximum bit number of the direct-link HARQ feedback bit and/or the second HARQ maximum bit number of the uplink HARQ feedback bit configured by the access network device.

Exemplary, if the first HARQ maximum bit number of the direct-link HARQ feedback bit configured by the access network device for the first terminal is 1 bit, and the second HARQ maximum bit number of the uplink HARQ feedback bit configured by the access network device for the first terminal is 2 bit, it is determined the HARQ maximum bit number of the corresponding available data transmission opportunity is 2 bit.

At block 403, the first terminal obtains the target HARQ codebook by concatenating HARQ feedback bits needing to be fed back at the plurality of available data transmission opportunities in a first predetermined order.

The bit number of the target HARQ codebook is a sum of the HARQ maximum bit numbers corresponding respectively to the plurality of available data transmission opportunities. The target HARQ codebook includes the uplink HARQ feedback bit and the direct-link HARQ feedback bit.

Alternatively, the first predetermined order may be a predefined or preconfigured order.

Alternatively, the first predetermined order includes: an order of the direct-link HARQ feedback bit being in front of the uplink HARQ feedback bit, or an order the uplink HARQ feedback bit being in front of the direct-link HARQ feedback bit, or a time sequence corresponding to the plurality available data transmission opportunities, or a preconfigured sequence corresponding to the plurality available data transmission opportunities.

Alternatively, for each available data transmission opportunity in the plurality of available data transmission opportunities, when the bit number of the HARQ feedback bit to be fed back is less than the HARQ maximum bit number, the first terminal pads the HARQ feedback bit with a repeat of the HARQ feedback bit or with a fixed bit value until the bit number of the HARQ feedback bit reaches the HARQ maximum bit number.

Exemplary, the fixed bit value is configured to indicate ACK or NACK.

Alternatively, if there is no downlink data transmission or no direct-link data transmission at a certain available data transmission opportunity, the HARQ feedback bit corresponding to the available data transmission opportunity is configured to indicate a default reception status, which is not limited in the embodiment. Exemplary, the default reception status is NACK.

Figure 5:
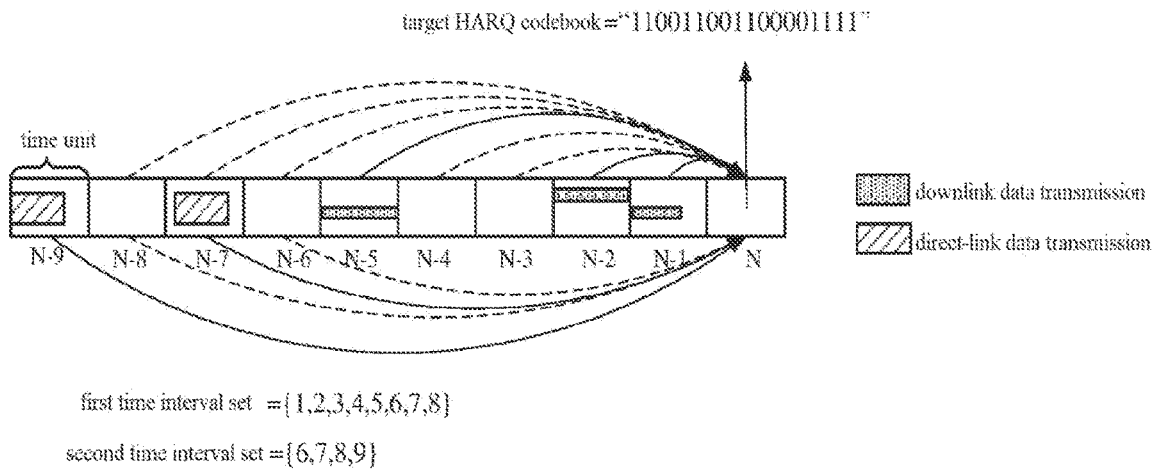
FIG. 5 is a schematic diagram illustrating a data transmission involved in a method for transmitting data based on a direct-link communication according to an example embodiment.

In an example, as illustrated in FIG. 5, the first terminal receives the time interval set configured by the access network device, the time interval set includes a first time interval set and a second time interval set. The first time interval set is a set of a time interval between a transmission of the downlink data and a transmission of the uplink HARQ feedback bit corresponding to the downlink data, for example, the first time interval set={1, 2, 3, 4, 5, 6, 7, 8}. The second time interval set is a set of a time interval between a transmission of the direct-link data and a transmission of the direct-link HARQ feedback bit corresponding to the direct-link data, for example, the second time interval set={6, 7, 8, 9}. The first terminal lists all available data transmission opportunities for feedback within the target time unit N based on the time interval set, i.e., from time unit N−9 to N−1. The possible direct-link data transmission opportunities include N−9 to N−6, and the possible downlink data transmission opportunities include N−8 to N−1. Based on the data transmission in FIG. 5, N−9 and N−7 correspond to the direct-link data transmission, N−5, N−2 and N−1 correspond to the downlink data transmission. No downlink data transmission or direct-link data transmission corresponds to N−8, N−6, N−4 and N−3. Assume that all data transmissions are correctly received, the HARQ feedback bit with a value of 1 indicates ACK, the HARQ feedback value with a value of 0 indicates NACK, the bit number of the direct-link HARQ feedback bit corresponding to the direct-link data is 1 bit and it is padded with a repeat of the HARQ feedback bit to 2 bits. Each available data transmission opportunity corresponds to 2 bits. The terminal may obtain the target HARQ codebook "110011001100001111" by ranking the uplink HARQ feedback bits and the direct-link HARQ feedback bits based on the time sequence corresponding to the plurality of available data transmission opportunities.

For the dynamic HARQ codebook, the first terminal determines the target time unit, and merges all HARQ feedback bits indicated to be fed back within the target time unit based on a time sequence. The first terminal determines the bit number to be fed back based on a count DAI value and/or a total DAI value in the DCI.

Alternatively, when both the codebook type corresponding to the uplink HARQ feedback bit and the codebook type corresponding to the direct-link HARQ feedback bit are dynamic HARQ codebooks, obtaining by the first terminal the target HARQ codebook based on the uplink HARQ feedback bit and the direct-link HARQ feedback bit includes obtaining the target HARQ codebook by concatenating a plurality of HARQ feedback bits indicated to be fed back within the target time unit in a time sequence.

The target HARQ codebook includes the uplink HARQ feedback bit and the direct-link HARQ feedback bit.

Alternatively, the time sequence is a sequence indicated in a downlink assignment index (DAI) in the DCI. The DAI includes the count DAI value and/or the total DAI value.

The DAI is configured to indicate a bit order of the HARQ feedback bit corresponding to the DCI in the target time unit.

The count DAI value is configured to indicate a downlink data transmission and a direct-link data transmission fed back within the same time unit. Alternatively, the access network device sends the DCI of scheduling the direct-link communication to the first terminal. The DCI includes the count DAI value. For multiple downlink data transmissions or direct-link data transmissions of reporting the HARQ feedback bits within the target time unit, the count DAI value in the DCI of scheduling the downlink data transmission or the direct-link data transmission is increased gradually according to the transmission time of the DCI.

Alternatively, when the DCIs of scheduling the downlink data transmission and the direct-link data transmission are transmitted simultaneously, the count DAI values in the DCIs are increased gradually according to a fixed order.

Exemplary, the count DAI value in the DCI of scheduling the downlink data transmission is increased firstly and then the count DAI value in the DCI of scheduling the direct-link data transmission is increased; or, the count DAI value in the DCI of scheduling the direct-link data transmission is increased firstly and then the count DAI value in the DCI of scheduling the downlink data transmission is increased; or the count DAI value is increased gradually based on the frequency domain positions of different DCI transmissions, which is not limited herein.

The DCI includes the count DAI value, and further includes the total DAI value. The total DAI value is equal to the last count DAI value of the current DCI transmission.

Exemplary, the count DAI value is denoted as counter DAI, and the total DAI value is denoted as total DAI.

Figure 6:
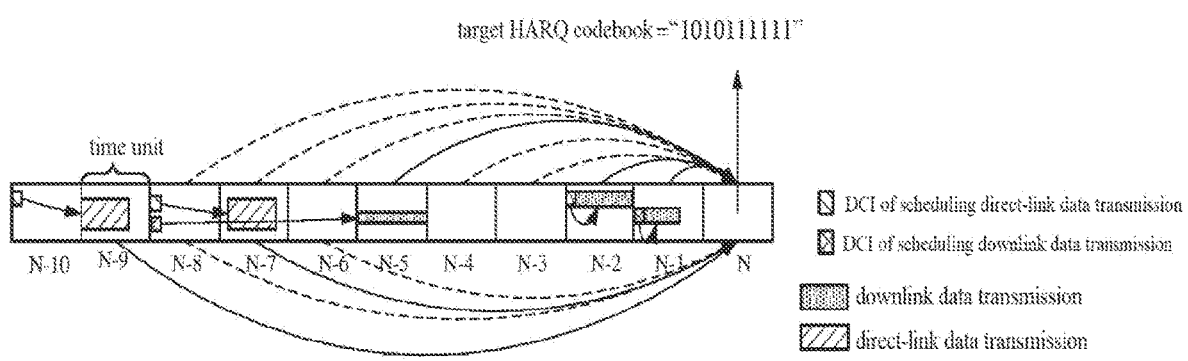
FIG. 6 is a schematic diagram illustrating a data transmission involved in a method for transmitting data based on a direct-link communication according to another example embodiment.

In an example, based on the data transmission in FIG. 5, FIG. 6 illustrates the direct-link data transmission, the downlink data transmission and the corresponding DCI transmission needing to be sent within the time unit N. It can be seen that there are five DCIs (DCI1 to DCI5). Based on DCI1 and DCI2, the direct-link data transmission is scheduled for twice. Based on DCI3, DCI4 and DCI5, the downlink data transmission is scheduled for three times. The direct-link HARQ feedback bits corresponding to the two direct-link data transmissions and the uplink HARQ feedback bits corresponding to the three downlink data transmissions need to be sent within the time unit N. The counter DAI and the total DAI in each of the five DCI5 (DCI1 to DCI5) are shown in Table 1. The counter DAIS in DCI1 to DCI5 are increased gradually. Since DCI2 and DCI3 are transmitted simultaneously, the total DAIS for both DCI2 and DCI3 are the current maximum counter DAI, i.e., 3. Assuming that all data are correctly received and the HARQ feedback bit is padded with 0, the first terminal may obtain the target HARQ codebook "1010111111" by concatenating the plurality of HARQ feedback bits indicated to be fed back within the target time unit in sequence based on the counter DAI.

TABLE 1

| DCI | counter DAI | total DAI |
|-----|-------------|-----------|
| DCI1 | 1 | 1 |
| DCI2 | 2 | 3 |
| DCI3 | 3 | 3 |
| DCI4 | 4 | 4 |
| DCI5 | 5 | 5 |

In another possible implementation, the first terminal generates an uplink HARQ sub codebook and a direct-link HARQ sub codebook independently, and merges the uplink HARQ sub codebook and the direct-link HARQ sub codebook to obtain the target HARQ codebook. The uplink HARQ sub codebook include the uplink HARQ feedback bit of at least one downlink data transmission. The direct-link HARQ sub codebook includes the direct-link HARQ feedback bit of at least one direct-link data transmission.

Figure 7:
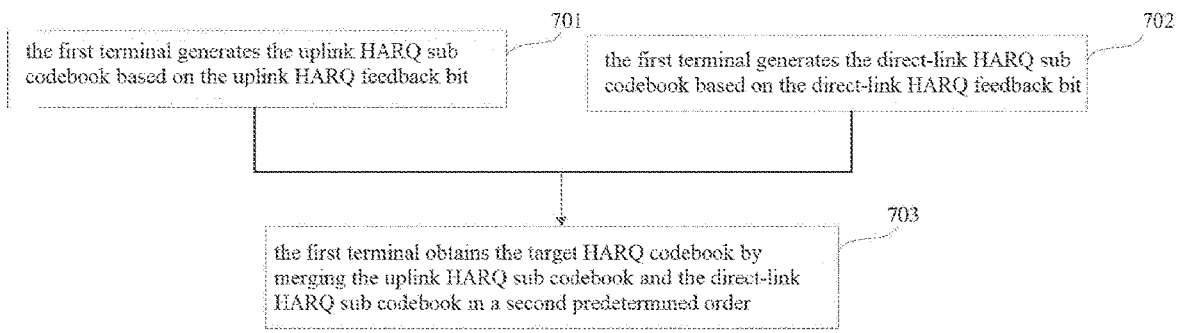
FIG. 7 is a flowchart illustrating a method for transmitting data based on a direct-link communication according to another example embodiment.

Alternatively, the first terminal obtains the target HARQ codebook based on the uplink HARQ feedback bit and the direct-link HARQ feedback bit by the following blocks, as illustrated in FIG. 7.

At block 701, the first terminal generates the uplink HARQ sub codebook based on the uplink HARQ feedback bit.

The uplink HARQ sub codebook includes the uplink HARQ feedback bit corresponding to at least one downlink data transmission needing to be fed back within the target time unit.

At block 702, the first terminal generates the direct-link HARQ sub codebook based on the direct-link HARQ feedback bit.

The direct-link HARQ sub codebook includes the direct-link HARQ feedback bit corresponding to at least one direct-link data transmission needing to be fed back within the target time unit.

It should be noted that, block 701 and block 702 are performed in parallel, or block 702 may be performed before block 701, or block 701 may be performed before block 702, which is not limited herein.

Alternatively, the first terminal receives a second downlink signaling sent by the access network device and generates the direct-link HARQ sub codebook based on the configured codebook type of the direct-link HARQ sub codebook. The second downlink signaling is configured to indicate a configured codebook type of the direct-link HARQ sub codebook. The direct-link HARQ sub codebook includes the direct-link HARQ feedback bit.

The first terminal generating the direct-link HARQ sub codebook based on the configured codebook type of the direct-link HARQ sub codebook includes, but is not limited to the following two possible implementations.

In a possible implementation, when the configured codebook type of the direct-link HARQ sub codebook is the semi-static codebook, a plurality of direct-link data transmission opportunities for HARQ feedback within the target time unit are determined, HARQ maximum bit numbers corresponding respectively to the plurality of direct-link data transmission opportunities are determined, and the direct-link HARQ sub codebook is obtained by concatenating direct-link HARQ feedback bits needing to be fed back at the plurality of direct-link data transmission opportunities. The bit number of the direct-link HARQ sub codebook is a sum of HARQ maximum bit numbers corresponding respectively to the plurality of direct-link data transmission opportunities.

It should be noted that, regarding the process of the first terminal obtaining the direct-link HARQ sub codebook by concatenating the direct-link HARQ feedback bits needing to be fed back at the plurality of direct-link data transmission opportunities, an analogy may be made with related details of the above process of the first terminal obtaining the target HARQ codebook by concatenating the HARQ feedback bits needing to be fed back at the plurality of available data transmission opportunities in the first predetermined order, which is not elaborated herein.

In another possible implementation, when the codebook type of the direct-link HARQ sub codebook is the dynamic codebook, the direct-link HARQ sub codebook is obtained by concatenating a plurality of direct-link HARQ feedback bits indicated to be fed back within the target time unit in a time sequence.

It should be noted that, regarding the process of the first terminal obtaining the direct-link HARQ sub codebook by concatenating the plurality of direct-link HARQ feedback bits indicated to be fed back within the target time unit in the time sequence, an analogy can be made with related details of the process of the first terminal obtaining the target HARQ codebook by concatenating the plurality of HARQ feedback bits indicated to be fed back within the target time unit based on the time sequence in the first predetermined order, which is not elaborated herein.

At block 703, the first terminal obtains the target HARQ codebook by merging the uplink HARQ sub codebook and the direct-link HARQ sub codebook in a second predetermined order.

Alternatively, the second predetermined order includes: an order of the direct-link HARQ feedback bit being in front of the uplink HARQ feedback bit, or an order the uplink HARQ feedback bit being in front of the direct-link HARQ feedback bit, or an order of the semi-static codebook being in front of the dynamic codebook, or an order of the dynamic codebook being in front of the semi-static codebook.

In an example, if the uplink HARQ sub codebook is "1111" and the direct-link HARQ sub codebook is "1010", the first terminal obtains the target HARQ codebook "10101111" by ranking the direct-link HARQ feedback bit in front of the uplink HARQ feedback bit.

In another example, if the uplink HARQ sub codebook is "1111" and has the codebook type of semi-static codebook, and the direct-link HARQ sub codebook is "1010" and has the codebook type of dynamic codebook, the first terminal obtains the target HARQ codebook "11111010" by ranking the semi-static codebook in front of the dynamic codebook.

In conclusion, by concatenating the HARQ feedback bits needing to be fed back at the plurality of available data transmission opportunities in different orders based on the codebook type corresponding to the uplink HARQ feedback bit and the codebook type corresponding to the direct-link HARQ feedback bit, the first terminal may not only support the data transmission in which both the codebook type corresponding to the uplink HARQ feedback bit and the codebook type corresponding to the direct-link HARQ feedback bit are semi-static HARQ codebook, but also support that both the codebook type corresponding to the uplink HARQ feedback bit and the codebook type corresponding to the direct-link HARQ feedback bit are dynamic HARQ codebook, thereby ensuring flexibility of the data transmission.

The apparatus embodiments will be described below, which may be used to perform the above method embodiments. For details not described in the apparatus embodiments, reference can be made to the above method embodiments.

Figure 8:
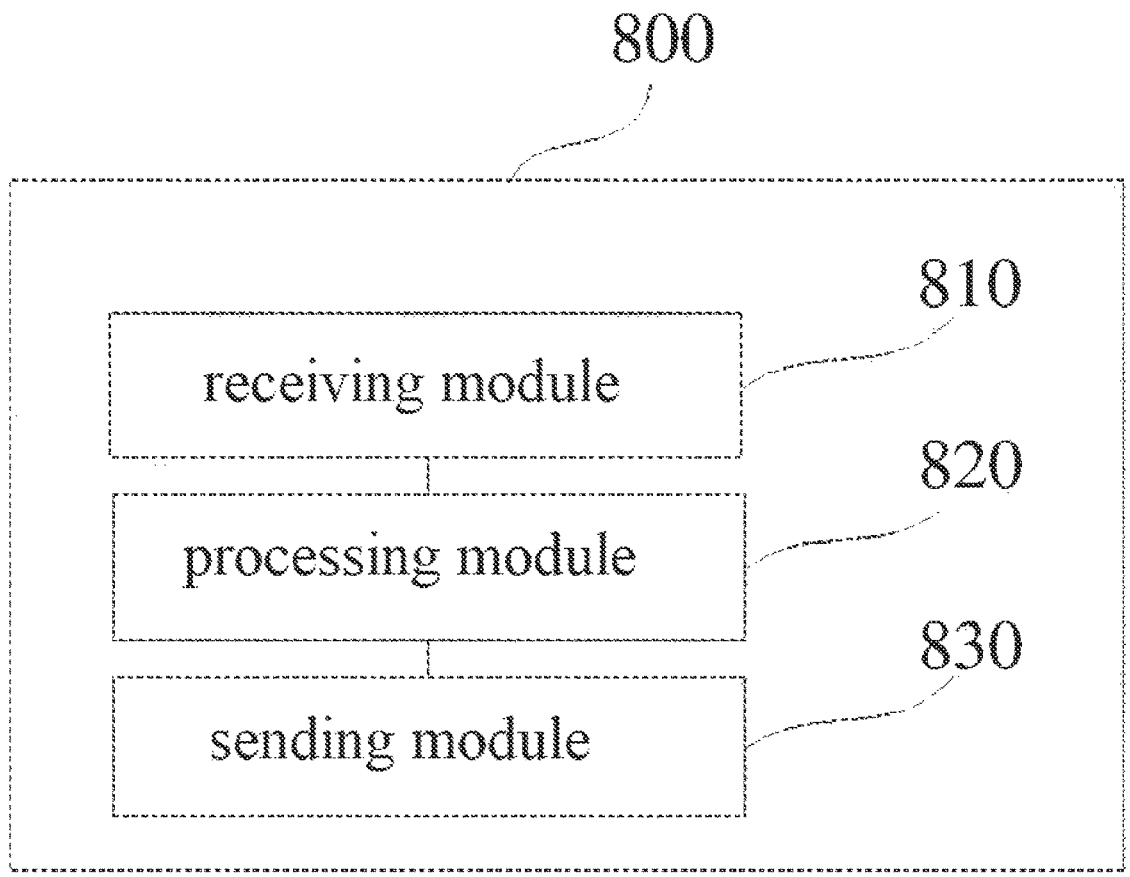
FIG. 8 is a block diagram illustrating an apparatus for transmitting data based on a direct-link communication according to an example embodiment.

FIG. 8 is a block diagram of an apparatus for transmitting data based on a direct-link communication according to an example embodiment of the present disclosure. The apparatus has a function capable to implement the above method at the terminal side, the function may be implemented by hardware, or by software corresponding to the hardware. The apparatus 800 may include a receiving module 810, a processing module 820 and a sending module 830.

The sending module 830 is configured to send an uplink HARQ feedback bit and a direct-link HARQ feedback bit to an access network device on a same physical layer uplink channel within a target time unit when the uplink HARQ feedback bit and the direct-link HARQ feedback bit need to be sent within the target time unit.

The uplink HARQ feedback bit is configured to indicate a reception status corresponding to downlink data, and the direct-link HARQ feedback bit is configured to indicate a reception status corresponding to direct-link data. The direct-link data is physical layer data sent by the first terminal to a second terminal via a direct link.

Alternatively, the apparatus further including the processing module 820.

The processing module 820 is configured to obtain a target HARQ codebook based on the uplink HARQ feedback bit and the direct-link HARQ feedback bit.

The sending module 830 is configured to send the target HARQ codebook to the access network device on a same physical uplink control channel (PUCCH) within the target time unit.

Alternatively, the apparatus further includes the receiving module 810. The receiving module 810 is configured to receive a first downlink signaling sent by the access network device, in which the first downlink signaling is configured to indicate a configured codebook type of the target HARQ codebook.

The codebook type indicative of a semi-static HARQ codebook is configured to indicate that both a codebook type corresponding to the uplink HARQ feedback bit and a codebook type corresponding to the direct-link HARQ feedback bit are semi-static HARQ codebooks. Or, the codebook type indicative of a dynamic HARQ codebook is configured to indicate that both a codebook type corresponding to the uplink HARQ feedback bit and a codebook type corresponding to the direct-link HARQ feedback bit are dynamic HARQ codebooks.

Alternatively, when both the codebook type corresponding to the uplink HARQ feedback bit and the codebook type corresponding to the direct-link HARQ feedback bit are semi-static HARQ codebooks, the processing module 820 is further configured to determine a plurality of available data transmission opportunities for HARQ feedback bits within the target time unit, determine HARQ maximum bit numbers corresponding respectively to the plurality of available data transmission opportunities and obtain the target HARQ codebook by concatenating HARQ feedback bits needing to be fed back at the plurality of available data transmission opportunities in a first predetermined order. A bit number of the target HARQ codebook is a sum of the HARQ maximum bit numbers corresponding respectively to the plurality of available data transmission opportunities. The target HARQ codebook includes the uplink HARQ feedback bit and the direct-link HARQ feedback bit.

Alternatively, the apparatus further includes the receiving module 810.

The receiving module 810 is configured to receive a time interval set configured by the access network device for the first terminal. The time interval set is a set of a time interval between a transmission of the downlink data and a transmission of the uplink HARQ feedback bit corresponding to the downlink data and/or a time interval between a transmission of the direct-link data and a transmission of the direct-link HARQ feedback bit corresponding to the direct-link data.

The processing module 820 is further configured to determine the plurality of available data transmission opportunities for the HARQ feedback bits within the target time unit based on the time interval set. The plurality of available data transmission opportunities include a downlink data transmission opportunity and a direct-link data transmission opportunity.

Alternatively, the processing module 820 is further configured to receive a first HARQ maximum bit number of the direct-link HARQ feedback bit and a second HARQ maximum bit number of the uplink HARQ feedback bit configured by the access network device for the first terminal; and determine a larger value of the first HARQ maximum bit number and the second HARQ maximum bit number as the HARQ maximum bit number.

Alternatively, the processing module 820 is further configured to, for each available data transmission opportunity in the plurality of available data transmission opportunities, pad an HARQ feedback bit to be fed back with a repeat of the HARQ feedback bit or with a fixed bit value until a bit number of the HARQ feedback bit reaches the HARQ maximum bit number, when the bit number of the HARQ feedback bit is less than the HARQ maximum bit number.

Alternatively, the first predetermined order includes: an order of the direct-link HARQ feedback bit being in front of the uplink HARQ feedback bit, or an order the uplink HARQ feedback bit being in front of the direct-link HARQ feedback bit, or a time sequence corresponding to the plurality available data transmission opportunities, or a preconfigured sequence corresponding to the plurality available data transmission opportunities.

Alternatively, when both the codebook type corresponding to the uplink HARQ feedback bit and the codebook type corresponding to the direct-link HARQ feedback bit are dynamic HARQ codebooks, the processing module 820 is further configured to obtain the target HARQ codebook by concatenating a plurality of HARQ feedback bits indicated to be fed back within the target time unit in a time sequence. The target HARQ codebook includes the uplink HARQ feedback bit and the direct-link HARQ feedback bit.

Alternatively, the time sequence is a sequence indicated in a downlink assignment index (DAI) in the DCI. The DAI includes a count DAI value and/or a total DAI value. The count DAI value is configured to indicate a transmission of the downlink data and a transmission of the direct-link data fed back within a same time unit.

Alternatively, the processing module 820 is further configured to generate uplink HARQ sub codebook based on the uplink HARQ feedback bit, generate a direct-link HARQ sub codebook based on the direct-link HARQ feedback bit, and obtain the target HARQ codebook by merging the uplink HARQ sub codebook and the direct-link HARQ sub codebook in a second predetermined order.

Alternatively, the apparatus further includes the receiving module 810.

The receiving module 810 is configured to receive a second downlink signaling sent by the access network device, in which the second downlink signaling is configured to indicate a configured codebook type of the direct-link HARQ sub codebook.

The processing module 820 is further configured to generate the direct-link HARQ sub codebook based on the configured codebook type of the direct-link HARQ sub codebook. The direct-link HARQ sub codebook includes the direct-link HARQ feedback bit.

Alternatively, the processing module 820 is further configured to determine a plurality of direct-link data transmission opportunities for HARQ feedback within the target time unit when the configured codebook type of the direct-link HARQ sub codebook is a semi-static codebook, determine HARQ maximum bit numbers corresponding respectively to the plurality of direct-link data transmission opportunities and obtain the direct-link HARQ sub codebook by concatenating direct-link HARQ feedback bits needing to be fed back at the plurality of direct-link data transmission opportunities based on the HARQ maximum bit numbers.

Alternatively, the processing module 820 is further configured to obtain the direct-link HARQ sub codebook by concatenating a plurality of direct-link HARQ feedback bits indicated to be fed back within the target time unit in a time sequence when the configured codebook type of the direct-link HARQ sub codebook is a dynamic codebook.

Alternatively, the second predetermined order includes: an order of the direct-link HARQ feedback bit being in front of the uplink HARQ feedback bit, or an order the uplink HARQ feedback bit being in front of the direct-link HARQ feedback bit, or an order of the semi-static codebook being in front of the dynamic codebook, or an order of the dynamic codebook being in front of the semi-static codebook.

In conclusion, in the technical solution provided in the embodiment, when the uplink HARQ feedback bit and the direct-link HARQ feedback bit need to be sent within the target time unit, the first terminal may reuse the uplink HARQ feedback unit and the direct-link HARQ feedback unit by using the same physical layer uplink channel within the target time unit to report, such that the resource collision problem due to superposition transmission of the direct-link HARQ feedback and the uplink HARQ feedback on time domain can be avoided, thus ensuring a success rate of information reception and transmission in a direct-link communication scenario, and facilitating improving a transmission efficiency of HARO feedback.

Figure 9:
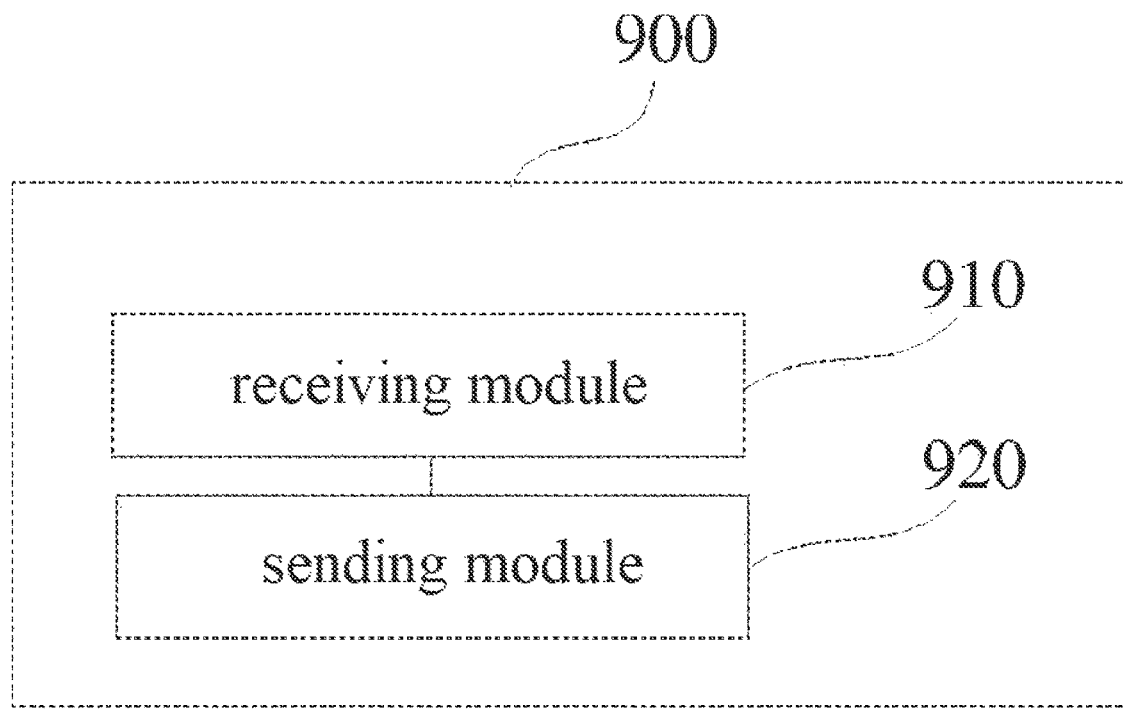
FIG. 9 is a block diagram illustrating an apparatus for transmitting data based on a direct-link communication according to another example embodiment.

FIG. 9 is a block diagram illustrating an apparatus for transmitting data based on a direct-link communication according to another example embodiment. The apparatus has a function capable to implement the above method at the access network device side, the function may be implemented by hardware, or by software corresponding to the hardware. The apparatus 900 may include a receiving module 910 and a sending module 920.

The receiving module 910 is configured to receive an uplink HARQ feedback bit and a direct-link HARQ feedback bit sent by a first terminal on a same physical layer uplink channel within a target time unit when the uplink HARQ feedback bit and the direct-link HARQ feedback bit sent by the first terminal need to be received within the target time unit.

The uplink HARQ feedback bit is configured to indicate a reception status corresponding to downlink data, and the direct-link HARQ feedback bit is configured to indicate a reception status corresponding to direct-link data. The direct-link data is physical layer data sent by the first terminal to a second terminal via a direct link.

Alternatively, the receiving module 910 is further configured to receive a target HARQ codebook sent by the first terminal on a same physical uplink control channel (PUCCH) within the target time unit. The target HARQ codebook includes the uplink HARQ feedback bit and the direct-link HARQ feedback bit.

Alternatively, the apparatus further includes the sending module 920.

The sending module 920 is configured to send a first downlink signaling to the first terminal, in which the first downlink signaling is configured to indicate a configured codebook type of the target HARQ codebook.

The codebook type indicative of a semi-static HARQ codebook is configured to indicate that both a codebook type corresponding to the uplink HARQ feedback bit and a codebook type corresponding to the direct-link HARQ feedback bit are semi-static HARQ codebooks. Or, the codebook type indicative of a dynamic HARQ codebook is configured to indicate that both a codebook type corresponding to the uplink HARQ feedback bit and a codebook type corresponding to the direct-link HARQ feedback bit are dynamic HARQ codebooks.

Alternatively, the sending module 920 is configured to send first configuration information to the first terminal. The first configuration information is configured to indicate a time interval set. The time interval set is a set of a time interval between a transmission of the downlink data and a transmission of the uplink HARQ feedback bit corresponding to the downlink data and/or a time interval between a transmission of the direct-link data and a transmission of the direct-link HARQ feedback bit corresponding to the direct-link data.

Alternatively, the sending module 920 is configured to send second configuration information to the first terminal. The second configuration information is configured to indicate a first HARQ maximum bit number of the direct-link HARQ feedback bit and/or a second HARQ maximum bit number of the uplink HARQ feedback bit configured by the access network device.

Alternatively, the target HARQ codebook includes the uplink HARQ feedback bit and the direct-link HARQ feedback bit ranked in a first predetermined order. Both the codebook type corresponding to the uplink HARQ feedback bit and the codebook type corresponding to the direct-link HARQ feedback bit are semi-static HARQ codebooks.

Alternatively, the first predetermined order includes: an order of the direct-link HARQ feedback bit being in front of the uplink HARQ feedback bit, or an order the uplink HARQ feedback bit being in front of the direct-link HARQ feedback bit, or a time sequence corresponding to a plurality available data transmission opportunities for HARQ feedback within the target time unit, or a preconfigured sequence corresponding to the plurality available data transmission opportunities.

Alternatively, the target HARQ codebook includes the uplink HARQ feedback bit and the direct-link HARQ feedback bit ranked in a time sequence. Both the codebook type corresponding to the uplink HARQ feedback bit and the codebook type corresponding to the direct-link HARQ feedback bit are dynamic HARQ codebooks.

Alternatively, the time sequence is a sequence indicated in a downlink assignment index (DAI) in the DCI. The DAI includes a count DAI value and/or a total DAI value. The count DAI value is configured to indicate a transmission of the downlink data and a transmission of the direct-link data fed back within a same time unit.

Alternatively, the target HARQ codebook includes an uplink HARQ sub codebook and a direct-link HARQ sub codebook ranked in a second predetermined order. The uplink HARQ sub codebook includes the uplink HARQ feedback bit. The direct-link HARQ sub codebook includes the direct-link HARQ feedback bit.

Alternatively, the second predetermined order includes: an order of the direct-link HARQ feedback bit being in front of the uplink HARQ feedback bit, or an order the uplink HARQ feedback bit being in front of the direct-link HARQ feedback bit, or an order of the semi-static codebook being in front of the dynamic codebook, or an order of the dynamic codebook being in front of the semi-static codebook.

Alternatively, the sending module 920 is configured to send a second downlink signaling to the first terminal. The second downlink signaling is configured to indicate a configured codebook type of the direct-link HARQ sub codebook. The codebook type includes one of a semi-static codebook and a dynamic codebook.

It should be noted that the division of modules in the above apparatus that is taken when implementing the functions is only for illustration. In actual applications, the functions may be assigned to different modules for implementation according to requirements, i.e., the apparatus may be divided into different modules so as to complete all or part of functions described above.

With respect to the apparatus according to the embodiment described above, the ways to perform operations by respective modules have been described in the associated method embodiments, which are not described here.

The technical solutions according to the embodiments of the present disclosure are described from the perspective of interaction between the access network device, the first terminal and the second terminal. It should be understood that the device (access network device, the first terminal and the second terminal) includes respective hardware structures and/or software modules for performing the above functions. In combination with the units and algorithm steps of the examples described in the embodiments disclosed in this specification, the embodiments of the present disclosure may be implemented by hardware, or a combination of hardware and computer software. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Figure 10:
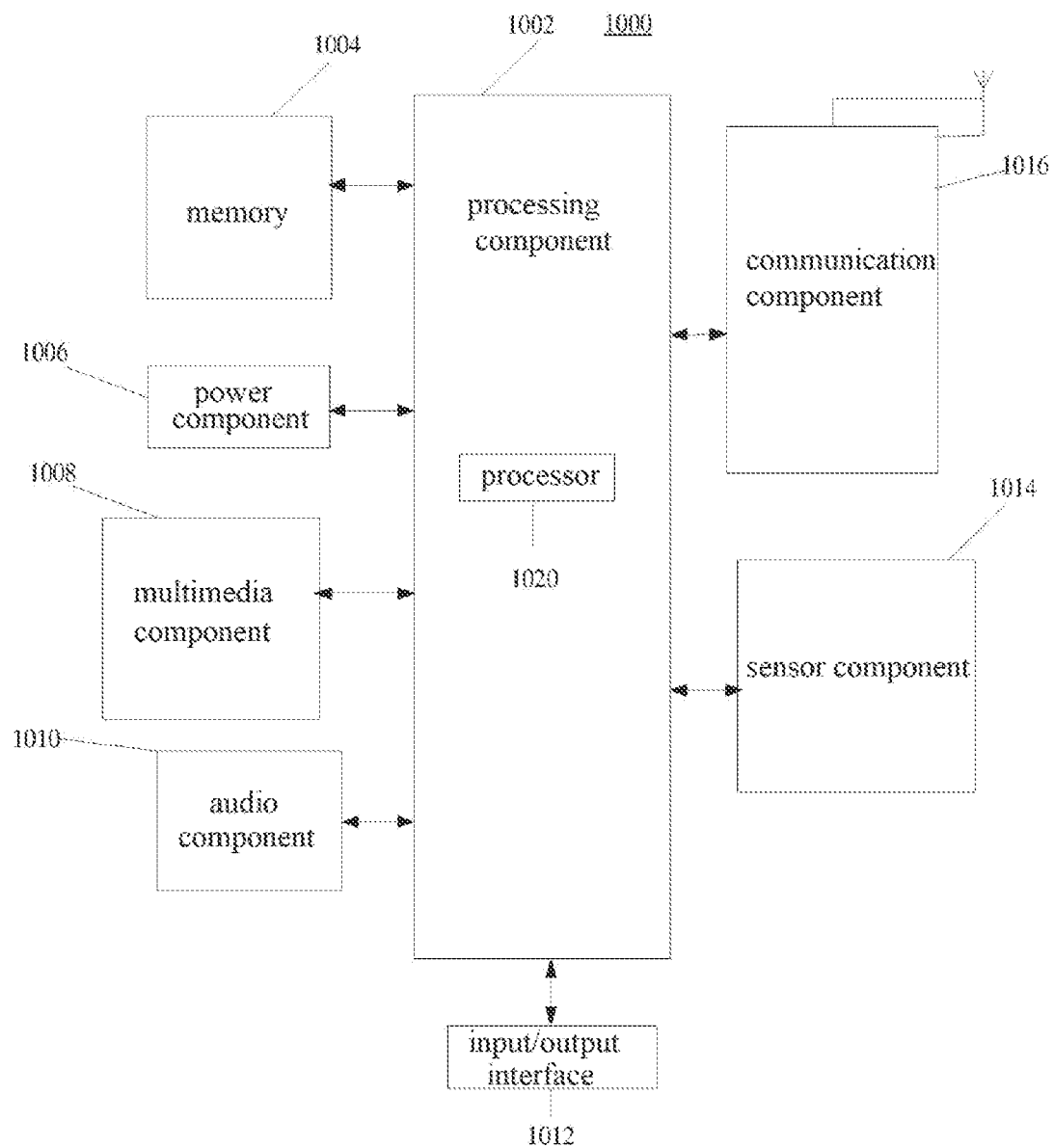
FIG. 10 is a block diagram illustrating a terminal according to an example embodiment.

FIG. 10 is a block diagram of a terminal 1000 according to an example embodiment. For example, the terminal 1000 may be a mobile phone, a computer, a digital broadcasting terminal, a messaging device, a game console, a tablet device, a medical device, a fitness device, a personal digital assistant, etc.

As illustrated in FIG. 10, the terminal 1000 may include one or more components: a processing component 1002, memory 1004, a power component 1006, a multimedia component 1008, an audio component 1010, an input/output (I/O) interface 1012, a sensor component 1014, and a communication component 1016.

The processing component 1002 generally controls the overall operations of the terminal 1000, such as operations associated with display, telephone calls, data communications, camera operations, and recording operations. The processing component 1002 may include one or more processors 1020 to execute instructions to complete all or part of the steps of the foregoing method. In addition, the processing component 1002 may include one or more modules to facilitate the interaction between the processing component 1002 and other components. For example, the processing component 1002 may include a multimedia module to facilitate the interaction between the multimedia component 1008 and the processing component 1002.

The memory 1004 is configured to store various types of data to support operations in the terminal 1000. Examples of these data include instructions for any application or method operating on the terminal 1000, contact data, phone book data, messages, pictures, videos, and so on. The memory 1004 can be implemented by any type of volatile or non-volatile storage device or their combination, such as static random access memory (SRAM), electrically erasable programmable read-only memory (EEPROM), erasable and programmable read-only memory (EPROM), programmable read-only memory (PROM), read-only memory (ROM), magnetic memory, flash memory, magnetic disk or optical disk.

The power component 1006 provides power to various components of the terminal 1000. The power component 1006 may include a power management system, one or more power supplies, and other components associated with generating, managing, and distributing power for the terminal 1000.

The multimedia component 1008 includes a screen that provides an output interface between the terminal 1000 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor can not only sense the boundary of the touch or slide action, but also detect the duration and pressure related to the touch or slide operation. In some embodiments, the multimedia component 1008 includes a front camera and/or a rear camera. When the terminal 1000 is in an operation mode, such as a shooting mode or a video mode, the front camera and/or the rear camera can receive external multimedia data. Each front camera and rear camera can be a fixed optical lens system or an optical lens system having focal length and optical zoom capabilities.

The audio component 1010 is configured to output and/or input audio signals. For example, the audio component 1010 includes a microphone (MIC). When the terminal 1000 is in an operating mode, such as a call mode, a recording mode, and a voice recognition mode, the microphone is configured to receive external audio signals. The received audio signals may be further stored in the memory 1004 or transmitted via the communication component 1016. In some embodiments, the audio component 1010 further includes a speaker for outputting audio signals.

The I/O interface 1012 provides an interface between the processing component 1002 and a peripheral interface module. The above-mentioned peripheral interface module may be a keyboard, a click wheel, a button, and the like. These buttons may include but are not limited to: home button, volume button, start button, and lock button.

The sensor component 1014 includes one or more sensors for providing the terminal 1000 with various aspects of state assessment. For example, the sensor component 1014 can detect the open/close state of the terminal 1000 and the relative positioning of components, such as the display and keypad of the terminal 1000. The sensor component 1014 can also detect the position change of the terminal 1000 or a component of the terminal 1000, presence or absence of contact of the user to the terminal 1000, the orientation or acceleration/deceleration of the terminal 1000, and the temperature change of the terminal 1000. The sensor component 1014 may include a proximity sensor configured to detect the presence of nearby objects when there is no physical contact. The sensor component 1014 may also include a light sensor, such as a CMOS or CCD image sensor, for use in imaging applications. In some embodiments, the sensor component 1014 may also include an acceleration sensor, a gyroscope sensor, a magnetic sensor, a pressure sensor or a temperature sensor.

The communication component 1016 is configured to facilitate wired or wireless communication between the terminal 1000 and other devices. The terminal 1000 can access a wireless network based on a communication standard, such as Wi-Fi, 2G, or 3G, or a combination thereof. In an exemplary embodiment, the communication component 1016 receives a broadcast signal or broadcast related information from an external broadcast management system via a broadcast channel. In an exemplary embodiment, the communication component 1016 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the terminal 1000 may be implemented by one or more application specific integrated circuits (ASICs), digital signal processors (DSP), digital signal processing devices (DSPD), programmable logic devices (PLD), field programmable gate array (FPGA), controller, microcontroller, microprocessor, or other electronic components, used to perform the above methods.

Another exemplary embodiment of the present disclosure provides a non-transitory computer-readable storage medium, such as memory 1004 including instructions, which can be executed by the processor 1020 of the terminal 1000 to complete the foregoing method. For example, the computer-readable storage medium may be ROM, random access memory (RAM), CD-ROM, magnetic tape, floppy disk, optical data storage device, etc.

A non-transient computer-readable storage medium is provided. When the instructions in the storage medium are executed by a processor of the first terminal, the first terminal can be caused to execute the above method.

Figure 11:
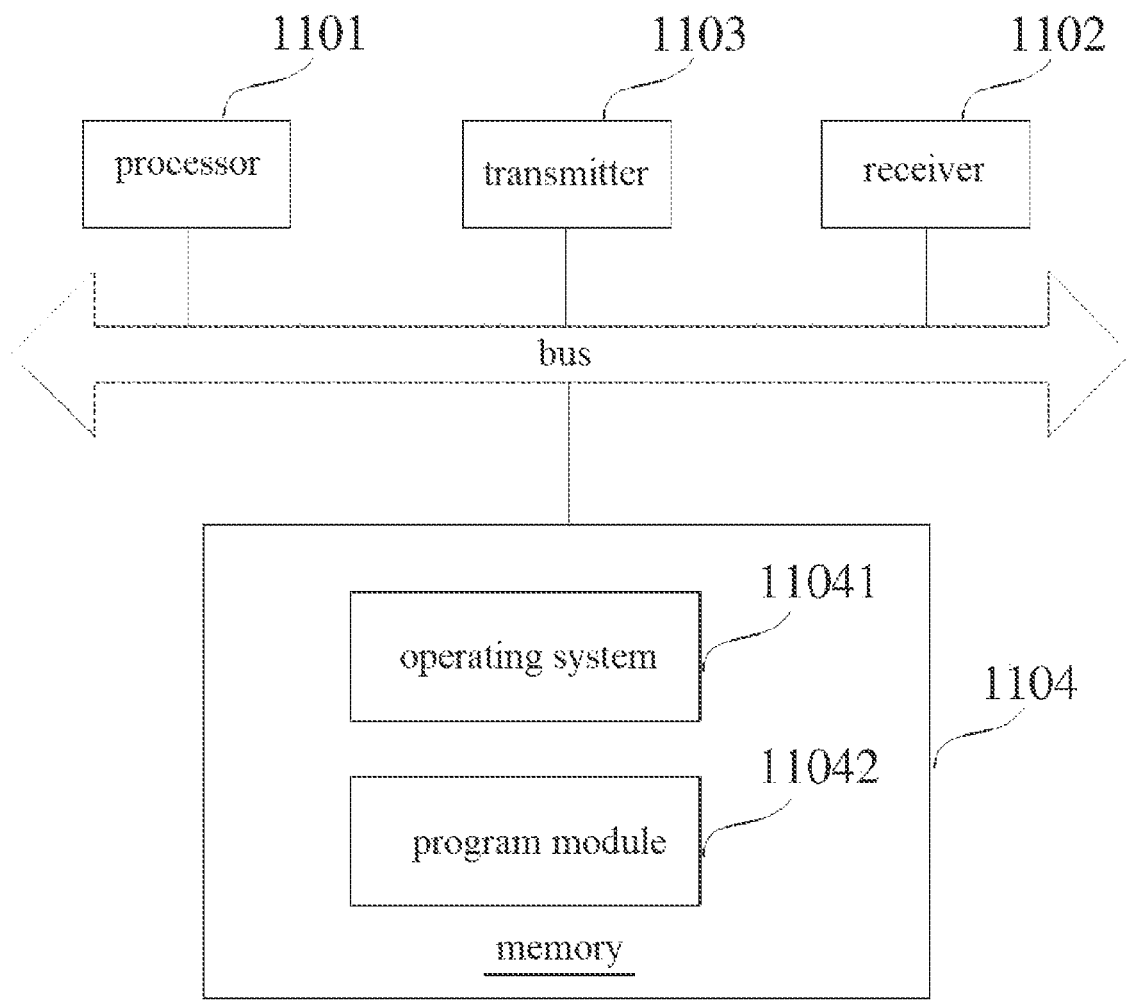
FIG. 11 is a block diagram illustrating an access network device according to an example embodiment.

FIG. 11 is a block diagram illustrating an access network device 1100 according to an embodiment of the present disclosure.

The access network device 1100 may include a processor 1101, a receiver 1102, a transmitter 1103 and memory 1104. The receiver 1102, the transmitter 1103 and the memory 1104 are respectively connected to the processor 1101 via a bus.

The processor 1101 includes one or more processing core. The processor 1101 may implement the method for transmitting data which is executed by the base station according to the embodiments of the present disclosure by running software programs and modules. The memory 1104 may be configured to store the software programs and modules. In detail, the memory 1104 may store an operating system 11041, at least one application program module 11042 for desired functionalities. The receiver 1102 may be configured to receive communication data sent by other devices. The transmitter 1103 may be configured to send the communication data to other devices.

Embodiments of the present disclosure further provide a data transmission system based on a direct-link communication. The data transmission system includes a terminal and an access network device.

The terminal may be such apparatus for transmitting data based on a direct-link communication provided in the embodiment described with reference in FIG. 8.

The access network device may be such apparatus for transmitting data based on a direct-link communication provided in the embodiment described with reference in FIG. 9.

Embodiments of the present disclosure further provide a data transmission system based on a direct-link communication. The data transmission system includes a terminal and an access network device.

The terminal may be such terminal provided in the embodiment described with reference in FIG. 10.

The access network device may be such access network device provided in the embodiment described with reference in FIG. 11.

Embodiments of the present disclosure provide computer-readable storage medium. The storage medium has at least one instruction, at least one program, at least one set of codes or set of instructions stored therein. The at least one instruction, the at least one program, the at least one set of codes or set of instructions are loaded and executed by a processor to implement steps in the above method for transmitting data based on a direct-link communication that executed by the first terminal or the access network device.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings and that various modifications and changes can be made without departing from the scope thereof. It is intended that the scope of the invention only be limited by the appended claims.

What is claimed is:

1. A method for transmitting data based on a direct-link communication, comprising:

sending by a first terminal, an uplink hybrid auto repeat request (HARQ) feedback bit and a direct-link HARQ feedback bit to an access network device on a same physical layer uplink channel within a target time unit when the uplink HARQ feedback bit and the direct-link HARQ feedback bit need to be sent within the target time unit;

wherein the uplink HARQ feedback bit is configured to indicate a reception status corresponding to downlink data, and the direct-link HARQ feedback bit is configured to indicate a reception status corresponding to direct-link data, wherein the direct-link data is physical layer data sent by the first terminal to a second terminal via a direct link;

wherein, sending by the first terminal, the uplink HARQ feedback bit and the direct-link HARQ feedback bit to the access network device on the same physical layer uplink channel within the target time unit comprises:

obtaining a target HARQ codebook based on the uplink HARQ feedback bit and the direct-link HARQ feedback bit; and sending the target HARQ codebook to the access network device on a same physical uplink control channel (PUCCH) within the target time unit;

wherein the method further comprises:

receiving a first downlink signaling sent by the access network device, wherein the first downlink signaling is configured to indicate a configured codebook type of the target HARQ codebook;

wherein the codebook type indicative of a semi-static HARQ codebook is configured to indicate that both a codebook type corresponding to the uplink HARQ feedback bit and a codebook type corresponding to the direct-link HARQ feedback bit are semi-static HARQ codebooks; or the codebook type indicative of a dynamic HARQ codebook is configured to indicate that both the codebook type corresponding to the uplink HARQ feedback bit and the codebook type corresponding to the direct-link HARQ feedback bit are dynamic HARQ codebooks;

wherein when both the codebook type corresponding to the uplink HARQ feedback bit and the codebook type corresponding to the direct-link HARQ feedback bit are semi-static HARQ codebooks, obtaining by the first terminal the target HARQ codebook based on the uplink HARQ feedback bit and the direct-link HARQ feedback bit comprises:

determining a plurality of available data transmission opportunities for HARQ feedback bits within the target time unit;

determining HARQ maximum bit numbers corresponding respectively to the plurality of available data transmission opportunities; and obtaining the target HARQ codebook by concatenating the HARQ feedback bits needing to be fed back at the plurality of available data transmission opportunities in a first predetermined order, wherein a bit number of the target HARQ codebook is a sum of the HARQ maximum bit numbers corresponding respectively to the plurality of available data transmission opportunities, and the target HARQ codebook includes the uplink HARQ feedback bit and the direct-link HARQ feedback bit.

2. The method of claim 1, further comprising:

receiving a time interval set configured by the access network device for the first terminal, wherein the time interval set is a set of at least one of a time interval between a transmission of the downlink data and a transmission of the uplink HARQ feedback bit corresponding to the downlink data and a time interval between a transmission of the direct-link data and a transmission of the direct-link HARQ feedback bit corresponding to the direct-link data;

wherein determining the plurality of available data transmission opportunities for the HARQ feedback bits within the target time unit comprises:

determining the plurality of available data transmission opportunities for the HARQ feedback bits within the target time unit based on the time interval set, wherein the plurality of available data transmission opportunities include a downlink data transmission opportunity and a direct-link data transmission opportunity.

3. The method of claim 1, wherein determining the HARQ maximum bit numbers corresponding respectively to the plurality of available data transmission opportunities comprises:

receiving a first HARQ maximum bit number of the direct-link HARQ feedback bit and a second HARQ maximum bit number of the uplink HARQ feedback bit configured by the access network device for the first terminal; and determining a larger value of the first HARQ maximum bit number and the second HARQ maximum bit number as the HARQ maximum bit number.

4. The method of claim 1, further comprising:

for each available data transmission opportunity in the plurality of available data transmission opportunities, when a bit number of the HARQ feedback bit to be fed back is less than the HARQ maximum bit number, padding by the first terminal the HARQ feedback bit with a repeat of the HARQ feedback bit or with a fixed bit value until the bit number of the HARQ feedback bit reaches the HARQ maximum bit number.

5. The method of claim 1, wherein, when both the codebook type corresponding to the uplink HARQ feedback bit and the codebook type corresponding to the direct-link HARQ feedback bit are dynamic HARQ codebooks, obtaining by the first terminal the target HARQ codebook based on the uplink HARQ feedback bit and the direct-link HARQ feedback bit comprises:

obtaining the target HARQ codebook by concatenating a plurality of HARQ feedback bits indicated to be fed back within the target time unit in a time sequence, wherein the target HARQ codebook comprises the uplink HARQ feedback bit and the direct-link HARQ feedback bit.

6. The method of claim 5, wherein the time sequence is a sequence indicated in a downlink assignment index (DAI) in downlink control information (DCI), wherein the DAI includes at least one of a count DAI value and a total DAI value, and the count DAI value is configured to indicate a transmission of the downlink data and a transmission of the direct-link data fed back within a same time unit.

7. The method of claim 1, wherein, obtaining by the first terminal the target HARQ codebook based on the uplink HARQ feedback bit and the direct-link HARQ feedback bit comprises:

generating an uplink HARQ sub codebook based on the uplink HARQ feedback bit;

generating a direct-link HARQ sub codebook based on the direct-link HARQ feedback bit; and obtaining the target HARQ codebook by merging the uplink HARQ sub codebook and the direct-link HARQ sub codebook in a second predetermined order.

8. The method of claim 7, further comprising:

receiving a second downlink signaling sent by the access network device, wherein the second downlink signaling is configured to indicate a configured codebook type of the direct-link HARQ sub codebook;

wherein generating the direct-link HARQ sub codebook based on the direct-link HARQ feedback bit comprises:

generating the direct-link HARQ sub codebook based on the configured codebook type of the direct-link HARQ sub codebook, wherein the direct-link HARQ sub codebook comprises the direct-link HARQ feedback bit.

9. The method of claim 8, wherein generating the direct-link HARQ sub codebook based on the configured codebook type of the direct-link HARQ sub codebook comprises:

determining a plurality of direct-link data transmission opportunities for HARQ feedback within the target time unit when the configured codebook type of the direct-link HARQ sub codebook is a semi-static codebook;

determining HARQ maximum bit numbers corresponding respectively to the plurality of direct-link data transmission opportunities; and obtaining the direct-link HARQ sub codebook by concatenating direct-link HARQ feedback bits needing to be fed back at the plurality of direct-link data transmission opportunities based on the HARQ maximum bit numbers.

10. The method of claim 8, wherein generating the direct-link HARQ sub codebook based on the configured codebook type of the direct-link HARQ sub codebook comprises:

obtaining the direct-link HARQ sub codebook by concatenating a plurality of direct-link HARQ feedback bits indicated to be fed back within the target time unit in a time sequence when the configured codebook type of the direct-link HARQ sub codebook is a dynamic codebook.

11. A method for transmitting data based on a direct-link communication, comprising:

receiving by an access network device, an uplink HARQ feedback bit and a direct-link HARQ feedback bit sent by a first terminal on a same physical layer uplink channel within a target time unit when the uplink HARQ feedback bit and the direct-link HARQ feedback bit sent by the first terminal need to be received within the target time unit;

wherein the uplink HARQ feedback bit is configured to indicate a reception status corresponding to downlink data, and the direct-link HARQ feedback bit is configured to indicate a reception status corresponding to direct-link data, wherein the direct-link data is physical layer data sent by the first terminal to a second terminal via a direct link;

wherein receiving by the access network device, the uplink HARQ feedback bit and the direct-link HARQ feedback bit sent by the first terminal on the same physical layer uplink channel within the target time unit comprises:

receiving by the access network device, a target HARQ codebook sent by the first terminal on a same physical uplink control channel (PUCCH) within the target time unit, wherein the target HARQ codebook comprises the uplink HARQ feedback bit and the direct-link HARQ feedback bit;

wherein the method further comprises:

sending by the access network device, a first downlink signaling to the first terminal, wherein the first downlink signaling is configured to indicate a configured codebook type of the target HARQ codebook;

wherein the codebook type indicative of a semi-static HARQ codebook is configured to indicate that both a codebook type corresponding to the uplink HARQ feedback bit and a codebook type corresponding to the direct-link HARQ feedback bit are semi-static HARQ codebooks; or the codebook type indicative of a dynamic HARQ codebook is configured to indicate that both the codebook type corresponding to the uplink HARQ feedback bit and the codebook type corresponding to the direct-link HARQ feedback bit are dynamic HARQ codebooks;

wherein when both the codebook type corresponding to the uplink HARQ feedback bit and the codebook type corresponding to the direct-link HARQ feedback bit are semi-static HARQ codebooks, the target HARQ codebook is obtained based on the uplink HARQ feedback bit and the direct-link HARQ feedback bit by:

determining a plurality of available data transmission opportunities for HARQ feedback bits within the target time unit;

determining HARQ maximum bit numbers corresponding respectively to the plurality of available data transmission opportunities; and obtaining the target HARQ codebook by concatenating the HARQ feedback bits needing to be fed back at the plurality of available data transmission opportunities in a first predetermined order, wherein a bit number of the target HARQ codebook is a sum of the HARQ maximum bit numbers corresponding respectively to the plurality of available data transmission opportunities, and the target HARQ codebook includes the uplink HARQ feedback bit and the direct-link HARQ feedback bit.

12. The method of claim 11, further comprising:

sending by the access network device, first configuration information to the first terminal, wherein the first configuration information is configured to indicate a time interval set, the time interval set is a set of at least one of a time interval between a transmission of the downlink data and a transmission of the uplink HARQ feedback bit corresponding to the downlink data and a time interval between a transmission of the direct-link data and a transmission of the direct-link HARQ feedback bit corresponding to the direct-link data.

13. The method of claim 11, further comprising:

sending by the access network device, second configuration information to the first terminal, wherein the second configuration information is configured to indicate at least one of:

a first HARQ maximum bit number of the direct-link HARQ feedback bit and a second HARQ maximum bit number of the uplink HARQ feedback bit configured by the access network device.

14. A first terminal, comprising:

a processor;

a transceiver connected to the processor; and a memory configured to store instructions executable by the processor;

wherein the processor is configured to load and execute the instructions to perform steps of the method for transmitting data based on a direct-link communication, comprising:

sending an uplink hybrid auto repeat request (HARQ) feedback bit and a direct-link HARQ feedback bit to an access network device on a same physical layer uplink channel within a target time unit when the uplink HARQ feedback bit and the direct-link HARQ feedback bit need to be sent within the target time unit;

wherein the uplink HARQ feedback bit is configured to indicate a reception status corresponding to downlink data, and the direct-link HARQ feedback bit is configured to indicate a reception status corresponding to direct-link data, wherein the direct-link data is physical layer data sent by the first terminal to a second terminal via a direct link;

wherein, sending the uplink HARQ feedback bit and the direct-link HARQ feedback bit to the access network device on the same physical layer uplink channel within the target time unit comprises:
obtaining a target HARQ codebook based on the uplink HARQ feedback bit and the direct-link HARQ feedback bit; and
sending the target HARQ codebook to the access network device on a same physical uplink control channel (PUCCH) within the target time unit;
wherein the method further comprises:
receiving a first downlink signaling sent by the access network device, wherein the first downlink signaling is configured to indicate a configured codebook type of the target HARQ codebook;
wherein the codebook type indicative of a semi-static HARQ codebook is configured to indicate that both a codebook type corresponding to the uplink HARQ feedback bit and a codebook type corresponding to the direct-link HARQ feedback bit are semi-static HARQ codebooks; or the codebook type indicative of a dynamic HARQ codebook is configured to indicate that both the codebook type corresponding to the uplink HARQ feedback bit and the codebook type corresponding to the direct-link HARQ feedback bit are dynamic HARQ codebooks;
wherein when both the codebook type corresponding to the uplink HARQ feedback bit and the codebook type corresponding to the direct-link HARQ feedback bit are semi-static HARQ codebooks, obtaining by the first terminal the target HARQ codebook based on the uplink HARQ feedback bit and the direct-link HARQ feedback bit comprises:
determining a plurality of available data transmission opportunities for HARQ feedback bits within the target time unit;
determining HARQ maximum bit numbers corresponding respectively to the plurality of available data transmission opportunities; and
obtaining the target HARQ codebook by concatenating the HARQ feedback bits needing to be fed back at the plurality of available data transmission opportunities in a first predetermined order, wherein a bit number of the target HARQ codebook is a sum of the HARQ maximum bit numbers corresponding respectively to the plurality of available data transmission opportunities, and the target HARQ codebook includes the uplink HARQ feedback bit and the direct-link HARQ feedback bit.

15. An access network device, comprising:
a processor; and
a transceiver connected to the processor; and
a memory configured to store instructions executable by the processor;
wherein the processor is configured to load and execute the instructions to perform steps of the method for transmitting data based on a direct-link communication according to claim 11.

* * * * *